(12) United States Patent
Lecours et al.

(10) Patent No.: US 8,985,354 B2
(45) Date of Patent: Mar. 24, 2015

(54) MOVEMENT SYSTEM CONFIGURED FOR MOVING A PAYLOAD IN A PLURALITY OF DIRECTIONS

(71) Applicants: GM Global Technology Operations LLC, Detroit, MI (US); Universite Laval, Quebec (CA)

(72) Inventors: Alexandre Lecours, Quebec (CA); Simon Foucault, Quebec (CA); Thierry Laliberte, Quebec (CA); Clement Gosselin, Quebec (CA); Boris Mayer-St-Onge, Quebec (CA); Dalong Gao, Rochester, MI (US); Roland J. Menassa, Macomb, MI (US)

(73) Assignees: GM Global Technology Operations LLC, Detroit, MI (US); Univerersite Laval, Quebec (CA)

( * ) Notice: Subject to any disclaimer, the term of this patent is extended or adjusted under 35 U.S.C. 154(b) by 308 days.

(21) Appl. No.: 13/664,963

(22) Filed: Oct. 31, 2012

(65) Prior Publication Data

US 2013/0112643 A1 May 9, 2013

Related U.S. Application Data (60) Provisional application No. 61/555,859, filed on Nov. 4, 2011.

(51) Int. Cl.
*B66C 13/16* (2006.01)
*B66C 13/18* (2006.01)
(Continued)

(52) U.S. Cl.
CPC .................. *B66C 13/18* (2013.01); *B66C 17/00* (2013.01); *G01B 7/30* (2013.01); *G01B 21/22* (2013.01); *B66C 13/22* (2013.01); *B66D 3/18* (2013.01)
USPC ........... 212/276; 212/312; 701/50; 324/207.2

(58) Field of Classification Search
CPC ........ B66C 13/18; B66C 13/22; B66C 19/00; B66C 19/005
USPC ............... 212/276, 284, 312, 324, 77, 83, 97, 212/101; 324/207.2, 207.21, 207.25; 33/1 PT, 732–735, 739, 743, 744; 701/50
See application file for complete search history.

(56) References Cited

U.S. PATENT DOCUMENTS 2,916,162 A * 12/1959 Gercke .......................... 212/273
4,471,877 A * 9/1984 Whitly .......................... 212/273
(Continued)

FOREIGN PATENT DOCUMENTS

| CN | 101450767 A | 6/2009 |
| CN | 101759092 A | 6/2010 |

(Continued)

*Primary Examiner* — Michael Mansen
*Assistant Examiner* — Nathaniel Adams
(74) *Attorney, Agent, or Firm* — Quinn Law Group, PLLC (57) ABSTRACT

A movement system includes a bridge crane, a trolley, and a movement device. The movement device includes an attachment portion, a plurality of housings, first and second curved elements, a cable, and a cable angle sensor. The curved elements are pivotally attached to housings and perpendicularly overlap with one another such that a first slot defined in the first curved element is perpendicular to a second slot defined in the second curved element. The first curved element is pivotable about a first axis and the second curved element is configured to pivot about a second axis. The cable extends from the attachment portion and through each of the slots. The cable is pivotable to angularly displace at least one of the curved elements about a respective axis. The cable angle sensor is configured to measure the angular displacement of the at least one of the first and second curved elements.

16 Claims, 8 Drawing Sheets

(51) Int. Cl.
*B66C 17/00* (2006.01)
*G01B 7/30* (2006.01)
*G01B 21/22* (2006.01)
*B66C 13/22* (2006.01)
*B66D 3/18* (2006.01)

(56) References Cited

U.S. PATENT DOCUMENTS 6,668,668 B1 * 12/2003 Peshkin .................. 324/207.15
7,185,774 B2 * 3/2007 Colgate et al. ................. 212/331
7,883,450 B2 * 2/2011 Hidler ............................. 482/69
2008/0110844 A1 5/2008 Lewis et al.
2011/0127229 A1 6/2011 Laliberte et al.

FOREIGN PATENT DOCUMENTS

JP 2000219482 A 8/2000
JP 2000289976 A 10/2000

* cited by examiner

MOVEMENT SYSTEM CONFIGURED FOR MOVING A PAYLOAD IN A PLURALITY OF DIRECTIONS

CROSS-REFERENCE TO RELATED APPLICATIONS

This application claims the benefit of U.S. Provisional Patent Application No. 61/555,859 filed on Nov. 4, 2011, which is hereby incorporated by reference in its entirety.

TECHNICAL FIELD

The present disclosure relates to a movement system that is configured for moving a mass in a plurality of directions.

BACKGROUND

Overhead bridge cranes are widely used to lift and relocate large payloads. Generally, the displacement in a pick and place operation involves three translational degrees of freedom and a rotational degree of freedom along a vertical axis. This set of motions, referred to as a Selective Compliance Assembly Robot Arm ("SCARA") motions or "Schönflies" motions, is widely used in industry. A bridge crane allows motions along two horizontal axes. With appropriate joints, it is possible to add a vertical axis of translation and a vertical axis of rotation. A first motion along a horizontal axis is obtained by moving a bridge on fixed rails while the motion along the second horizontal axis is obtained by moving a trolley along the bridge, perpendicularly to the direction of the fixed rails. The translation along the vertical axis is obtained using a vertical sliding joint or by the use of a belt. The rotation along the vertical axis is obtained using a rotational pivot with a vertical axis.

There are partially motorized versions of overhead bridge cranes that are displaced manually along horizontal axes and rotated manually along the vertical axis by a human operator, but that include a motorized hoist in order to cope with gravity along the vertical direction. Also, some bridge cranes are displaced manually along all of the axes, but the weight of the payload is compensated for by a balancing device in order to ease the task of the operator. Such bridge cranes are sometimes referred to as assist devices. Balancing is often achieved by pressurized air systems. These systems need compressed air in order to maintain pressure or vacuum—depending on the principle used—which requires significant power. Also, because of the friction in the compressed air cylinders, the displacement is not very smooth and can even be bouncy. Balancing can be achieved using counterweights, which add significant inertia to the system. Although helpful and even necessary for the vertical motion, such systems attached to the trolley of a bridge crane add significant inertia regarding horizontal motion due to moving the mass of these systems. In the case of balancing systems based on counterweights, the mass added can be very large, even larger than the payload itself. If the horizontal traveling speed is significant, the inertia added to the system becomes a major drawback.

There are also fully motorized versions of such bridge cranes that require powerful actuators, especially for the vertical axis of motion which has to support the weight of the payload. These actuators are generally attached to the trolley or bridge and are then in motion. The vertical translation actuator is sometimes attached to the bridge and linked to the trolley by a system similar to what is used in tower cranes.

SUMMARY

A movement system is configured for moving a payload. The movement system includes a bridge crane, a trolley, and a movement device. The bridge crane is configured for movement along an X axis. The trolley is movably attached to the bridge crane and configured for movement along a Y axis, in perpendicular relationship to the X axis. The movement device depends from the trolley. The movement device includes an attachment portion, a plurality of housings, a first curved element, a second curved element, a cable, and a cable angle sensor. The housings each operatively extend from the attachment portion. The first curved element and the second curved element extend between respective ends. The ends of the first and second curved elements are pivotally attached to a respective one of the plurality of housings. Each of the first and second curved elements form a partial circle. The first curved element defines a first slot and the second curved element defines a second slot. The first curved element perpendicularly overlaps with the second curved element such that the first slot of the first curved element is in perpendicular relationship to the second slot of the second curved element. The first curved element is configured to pivot about a first axis and the second curved element is configured to pivot about a second axis, which extends in perpendicular relationship to the first axis. The cable extends from the attachment portion and through each of the first slot and the second slot. The cable is configured to pivot relative to the attachment portion such that the cable angularly displaces at least one of the first and second curved elements about the respective first and second axis. The cable angle sensor is configured to measure the angular displacement of the at least one of the first and second curved elements.

A movement device is configured to determine a direction of intended movement of a payload. The movement device includes an attachment portion, a plurality of housings, a first curved element, a second curved element, a cable, and a cable angle sensor. Each of the housings operatively extend from the attachment portion. The first and second curved elements each extend between respective ends. The ends of the first and second curved elements are pivotally attached to a respective one of the plurality of housings. Each of the first and second curved elements form a partial circle. The first curved element defines a first slot and the second curved element defines a second slot. The first curved element perpendicularly overlaps with the second curved element such that the first slot of the first curved element is in perpendicular relationship to the second slot of the second curved element. The first curved element is configured to pivot about a first axis and the second curved element is configured to pivot about a second axis, which extends in perpendicular relationship to the first axis. The cable extends from the attachment portion and through each of the first and second slots. The cable is configured to pivot relative to the attachment portion such that the cable angularly displaces at least one of the first and second curved elements about the respective first and second axis. The cable angle sensor is configured to measure the angular displacement of the at least one of the first and second curved elements.

A method of moving a movement device along at least one of an X axis and a Y axis includes providing a cable angle sensor configured to measure angular displacement of at least one of a first and a second curved element about a respective first and second axis. A cable is disposed vertically through each of a first and a second slot defined in the respective first and second curved element. An angle is imparted to the cable such that the cable causes an angular displacement of at least one of the first and second curved elements about the respective first and second axis. The angular displacement of the at least one of the first and second curved elements about the respective first and second axis is determined. The movement device is moved along the at least one of the X axis and the Y axis in response to the determination of the angular displacement of the at least one of the first and second curved elements about the respective first and second axis until the cable is vertical.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
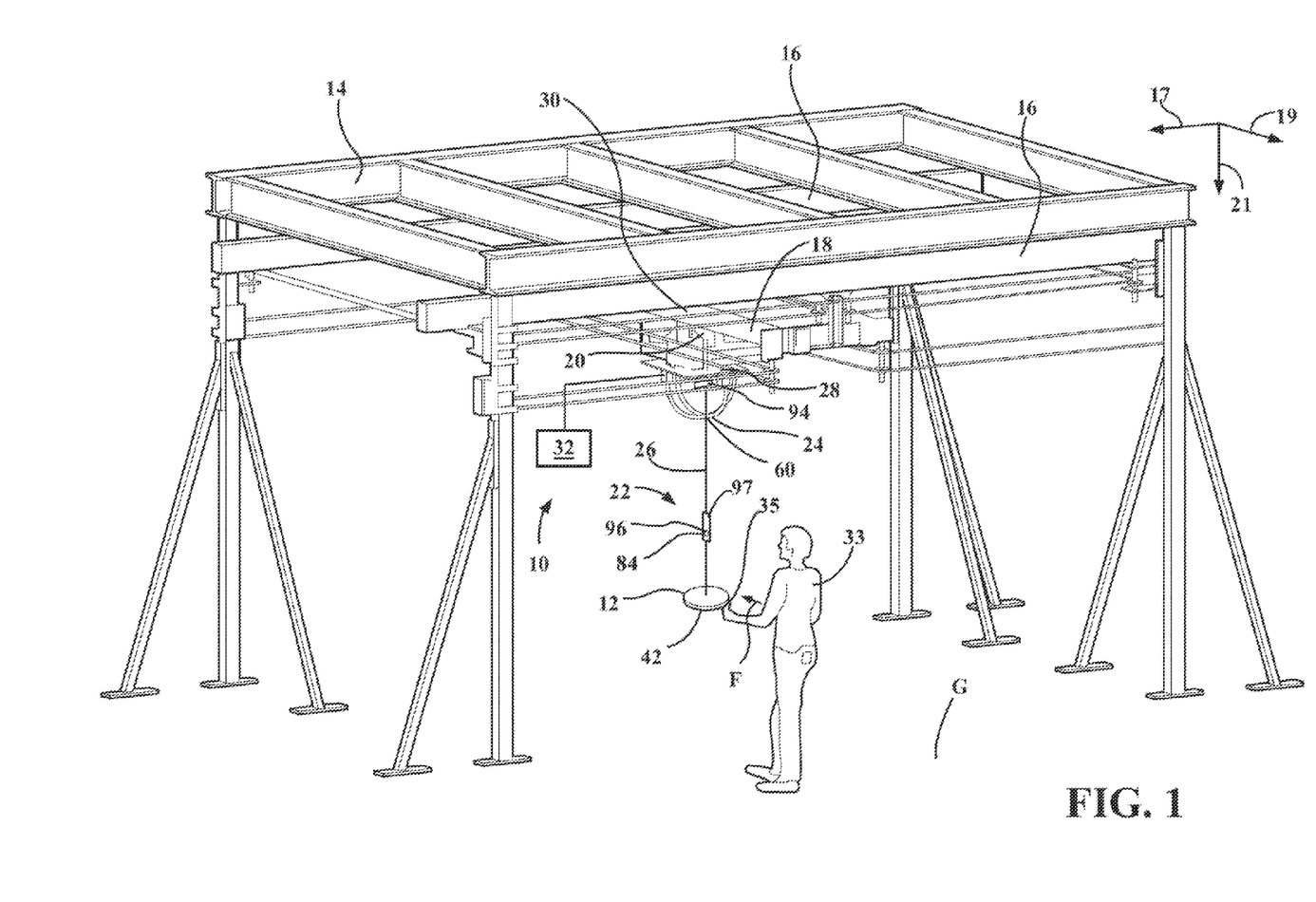
FIG. 1 is a schematic perspective view of a movement system including a movement device which is connected to a support structure and configured for moving a payload attached to a cable.

Referring to the drawings, wherein like reference numbers refer to like components, a movement system 10 configured for moving a payload 12 in a plurality of directions is shown at 10 in FIG. 1. The movement system 10 is mounted to a stationary support structure 14 that is configured to support the movement system 10 and the payload 12. The support structure 14 includes, but is not limited to, a pair of parallel rails 16 or runway tracks.

Referring to FIG. 1, the movement system 10 includes a bridge crane 18, a trolley 20, and a movement device 22. The bridge crane 18 is a structure that includes at least one girder 30 that spans the pair of parallel rails 16. The bridge crane 18 is adapted to carry the payload 12 along an Y axis 17. The trolley 20 is movably attached to girders 30 of the bridge crane 18 such that the trolley 20 is adapted to carry the payload 12 along an X axis 19, in generally perpendicular relationship to the Y axis 17. The movement device 22 is operatively attached to the trolley 20. A Z axis 21 extends in a vertical direction, with respect to the ground G, and is defined between the intersection of the X axis 19 and the Y axis 17.

Figure 2:
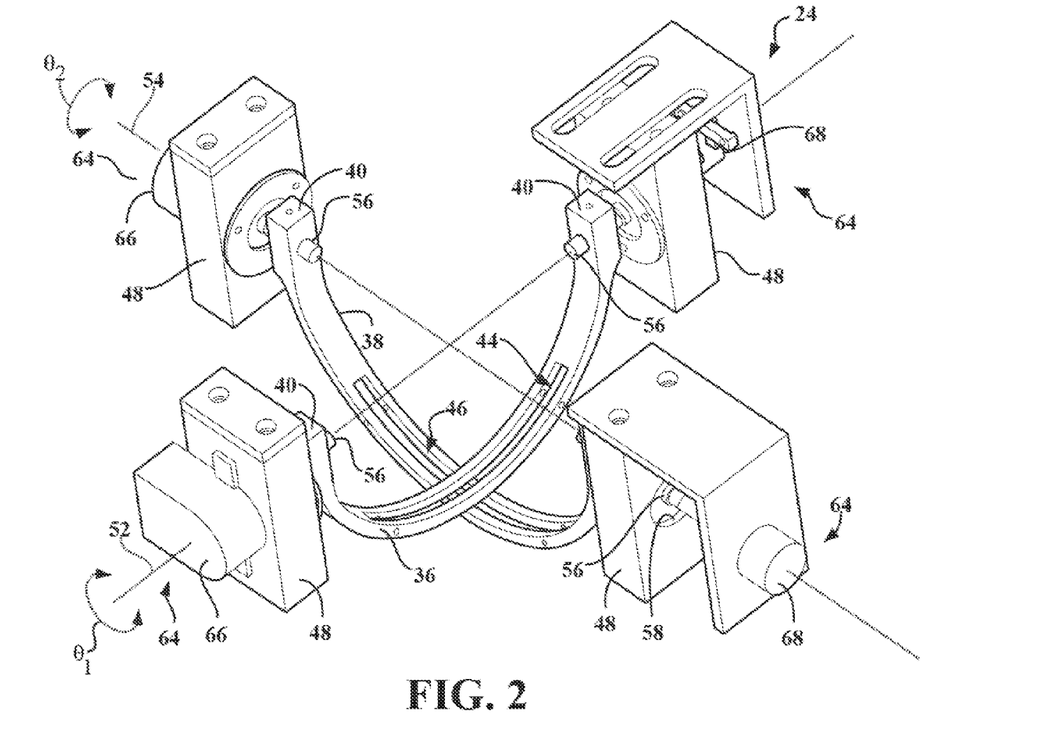
FIG. 2 is a schematic perspective view of cable angle sensor configured for measuring an angular displacement of the cable.

Referring to FIGS. 1 and 2, the movement device 22 includes a cable angle sensor 24, a suspended cable 26, a cart 28, and a controller 32. The cable 26 is configured for supporting the payload 12. The cable angle sensor 24 is configured to measure two degrees-of-freedom of the cable 26. Additionally, the movement device 22 is configured to allow the operator 33 to place their hands 35 anywhere directly on the payload 12. By being in close contact with the payload 12, it is easier for the operator to manipulate and to guide the movement device 22. When the operator is not restricted as to where to place their hands 35, the operator's 33 hand 35 placement can be adjusted to be more efficient, productive, comfortable, and to provide the operator with a clearer view of the task at hand. Direct placement of the operator's 33 hands 35 on the payload 12 may also allow the operator to maneuver the payload 12 with only one hand 35, while using the other hand 35 for another aspect of the task. Additionally, direct access to the payload 12 may allow many operators 33 to contact the payload 12 at the same time, since the system is configured to measure the result of the operators 33 combined applied forces to the payload 12.

Figure 5A:
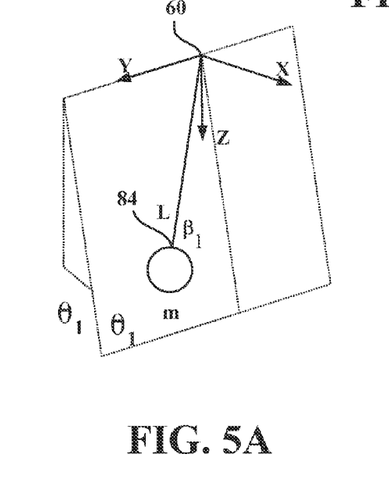
FIGS. 5A-5C are schematic diagrammatic views of parameter definitions of the movement system.
Figure 5B:
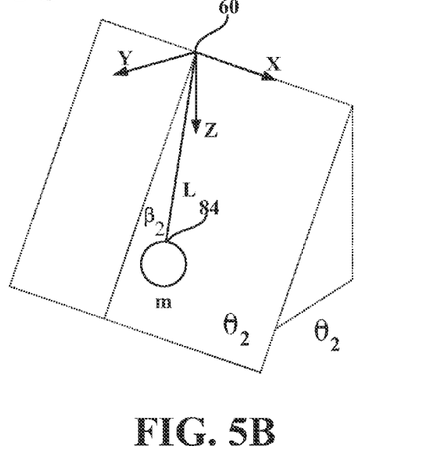
Figure 5C:
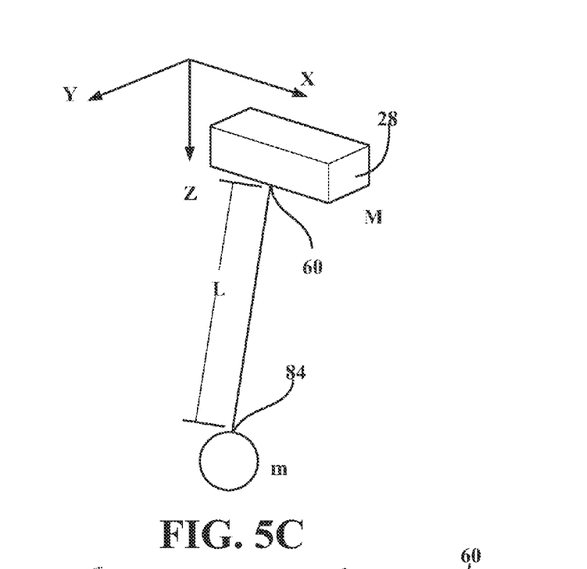

Referring to FIGS. 1 and 5, during operation, the operator 33 imparts an angle $\theta_1$ and $\theta_2$ to the cable 26, by pushing or otherwise applying a force F to the payload 12 in an X-Y plane. These angles $\theta_1$ and $\theta_2$ are measured by the cable angle sensor 24. The controller 32 is operatively connected to the movement device 22. The controller 32 is configured to move the cart 28 along the X axis 19 and/or the Y axis 17 in order to keep the cable 26 vertical (along the Z axis 21). Thus, the cart 28 moves in the direction desired by the operator 33 (direction of cable 26 displacement), while controlling the cable 26 sway, resulting in assistance to the operator 33 in moving the payload 12 along the X axis 19 and the Y axis 17. Since the controller 32 ensures that the cable 26 remains vertical, the operator 33 is not required to stop the payload 12 manually, since the controller 32 manages to cause the payload 12 to stop. Additionally, an autonomous mode, where the payload 12 position is prescribed, while reducing cable 26 sway may also be provided.

The cable angle sensor 24 may be configured to be absolute, precise, low cost, and provide high resolution in order to achieve the control objectives. The controller 32 is based on simplified cable 26 dynamics with state space control to provide cooperative motion and autonomous motion. The controller 32 may be modified to vary parameters, such as the cable 26 length. Additionally, the controller 32 does not need a mass of the cart 28 or the payload 12, but rather, adapts to varying parameters while being robust and intuitive to the operator 33.

Figure 3:
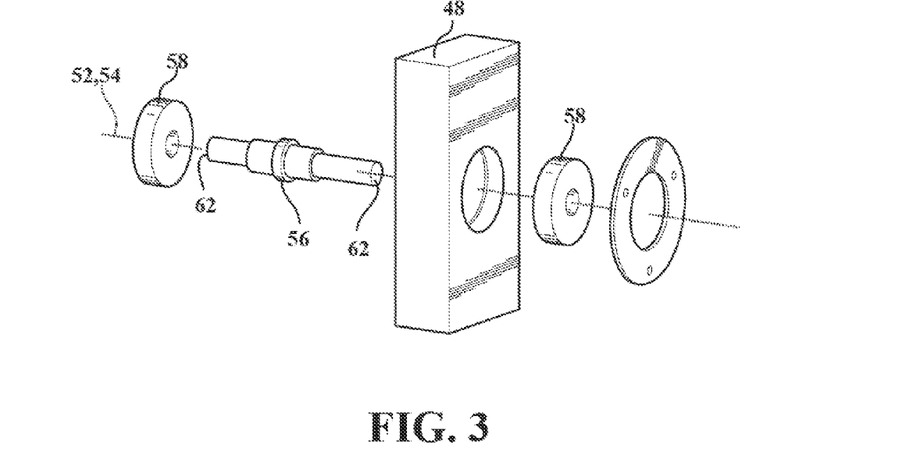
FIG. 3 is an exploded schematic perspective view of a housing, sensors, and a shaft of the cable angle sensor of FIG. 2.

Referring again to FIG. 2, the cable angle sensor 24 includes a first curved element 36 and a second curved element 38. Each curved element extends between respective ends 40. The curved elements 36, 38 each form a partial circle and are concentric such that they share a common center. The first element 36 defines a first slot 44 and the second element 38 defines a second slot 46. Each slot extends longitudinally between the respective ends 40. The first curved element 36 perpendicularly overlaps the second curved element 38 such that the slot of the first curved element 36 is in perpendicular relationship to the slot of the second curved element 38. The ends 40 of the curved elements 36, 38 are pivotally attached to a respective housing 48. The housings 48 are operatively attached to a mounting plate 50 (FIG. 4) such that the first curved element 36 pivots about a first axis 52 and the second curved element 38 pivots about a second axis 54, which extends in perpendicular, intersecting relationship to the first axis 52. A shaft 56 pivotally interconnects each of the ends 40 and the respective housing 48. More specifically, referring to FIG. 3, the shafts 56 are supported in the respective housing 48 by two bearings 58, ensuring that the rotation of the shaft 56 about the respective first and second axis 52, 54 is straight and the friction is low.

Figure 4:
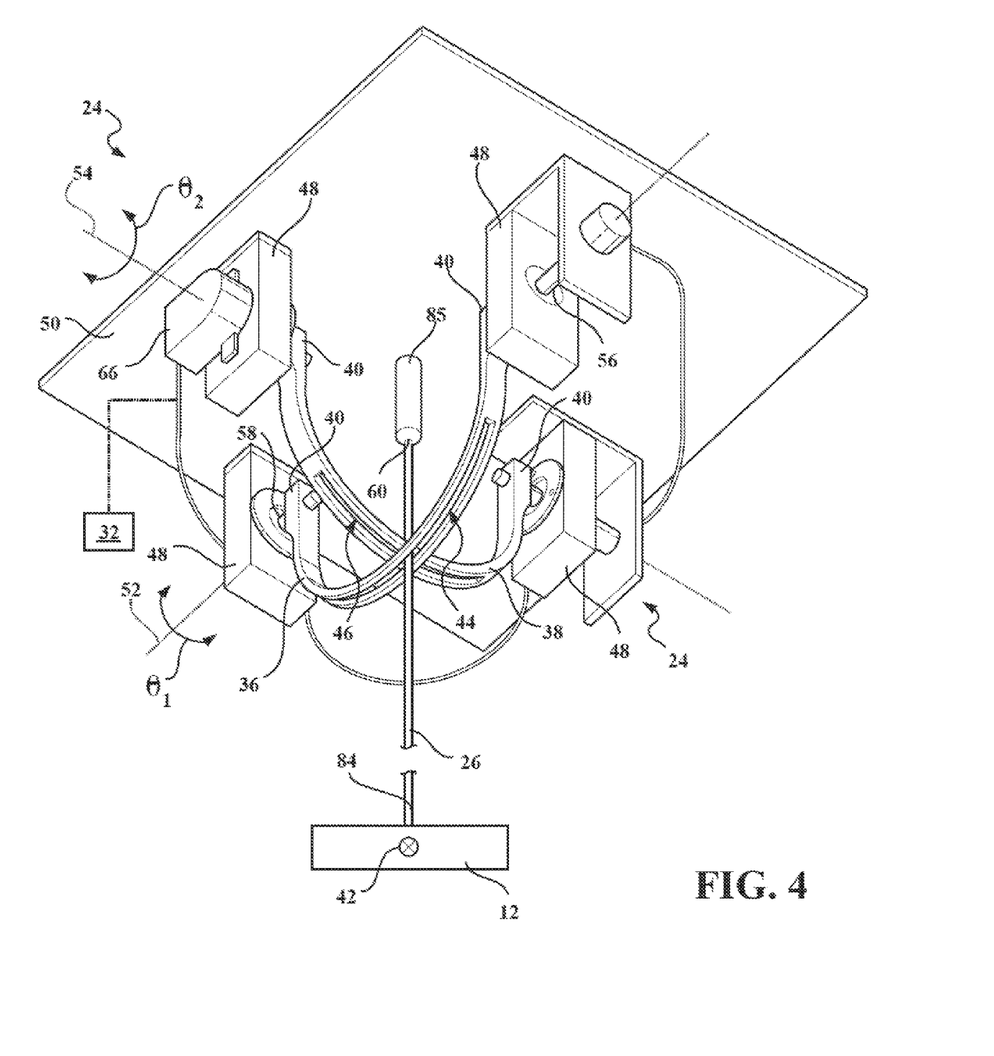
FIG. 4 is a schematic perspective view of the movement device supporting the payload.

Referring to FIG. 4, the cable 26 passes through the first slot 44 and the second slot 46. A pivot point 60 of the cable 26 should be aligned with each of the slots 44, 46 such that the cable 26 passes straight through the curved elements 36, 38 to prevent biased readings that might otherwise result due to the cable 26 bending around the curved elements 36, 38. Additionally, a portion of the slot 44 of the first curved element 36 overlaps with a portion of the slot 46 of the second curved element 38, throughout the angular displacement $\theta_1$ and $\theta_2$ of the first and second curved elements 36, 38, caused by the movement of the cable 26, which passes through the slots 44, 46. A guide 85 may be used to make sure the cable pivot point 60 stays the same. The slots 44, 46 may be configured to be slightly larger than the diameter of the cable 26. Flexible elements may be disposed in the slots 44, 46 to close the gap. The flexible elements may help prevent backlash from the cable 26 interfering with the slot, while maintaining easy movement of the cable 26 within the slots 44, 46.

Because there are two shafts 56 for each of the first axis 52 and the second axis 54, and each shaft 56 has two sides 62, several sensors 64 may be used for each axis. By way of a non-limiting example, an encoder 66 and a Hall effect sensor 68 may be used for each of the first axis 52 and the second axis 54. Although only one sensor per axis may be sufficient, combining the encoder 66 with the Hall effect sensor 68 provides many benefits. First of all, the signals from the encoder 66 and the Hall effect sensor 68 may be combined using data fusion to obtain a signal of better quality. Second of all, it is possible to compare both signals to detect problems, i.e., inaccuracies in the individual signals. Finally, the absolute signal of the Hall effect sensor 68 may be used, while taking advantage of the encoder 66 precision. Other sensors 64 could also be used. Absolute encoders 66, potentiometers or linear accelerometers (used as inclinometers) could be used as position sensor. A gyroscope could be used to obtain the angular velocity while an accelerometer could be used to obtain angular acceleration. Accelerometers or gyroscopes placed on the slotted parts could also help determine different dynamical effects. Photointerruptors could also be used at strategic places. Finally, the above signal can be derived/integrated to obtain corresponding signals.

The cart 28 is configured for moving the bridge crane 18 and/or the trolley 20 along the respective X axis 19 and Y axis 17 in response to the application of the force F to the payload 12. As the force F is applied to the payload 12 a direction along the X axis 19 and/or the Y axis 17, movement of the cable 26 within the slots 44, 46 of the curved elements 36, 38 causes the curved elements 36, 38 to rotate an angle $\theta_1$, $\theta_2$ about the respective first and second axes 52, 54. The sensors 64 measure an angle of rotation $\theta_1$, $\theta_2$ of the curved elements 36, 38 about the respective first and second axes 52, 54.

In order to be desensitized to small angle measurement precision errors, a deadband on the angle may be used. The deadband is an area of a sign range where no action on the system occurs. The movement device 22 may also be excited by small amplitude, high frequency unmodeled dynamics or it may be difficult for the control to manage high frequency oscillations. During oscillations, when the cable 26 is close to a vertical position, since the angle measurement often changes sign, it becomes difficult to suppress the oscillations. An algorithm, shown as an oscillation logic block 70, is provided to compensate for high frequency oscillations, while keeping precision and performance to keep the cable 26 vertical. It should be appreciated that one of the signals may be, for example, $\theta_1$. For a small deadband, $\theta_{db1}$ is used to cope with precision errors of the angle measurements. Two other angles are defined, $\theta_{db2}$ and $\theta_{db3}$. The signal $\theta_{p0}$ is determined in a deadband block 72 and expressed as follows:

$$\theta_{p0} = \begin{cases} 0 & \text{if } -\theta_{db1} < \theta < \theta_{db1} \\ \theta - \theta_{db1} & \text{if } \theta > \theta_{db1} \\ \theta + \theta_{db1} & \text{if } \theta < -\theta_{db1} \end{cases}$$

and the signal $\theta_{p1}$ is determined in a deadband and saturation block 74 and expressed as follows:

$$\theta_{p1} = \begin{cases} 0 & \text{if } -\theta_{db2} < \theta < \theta_{db2} \\ \theta - \theta_{db2} & \text{if } \theta_{db2} < \theta < \theta_{db3} \\ \theta + \theta_{db2} & \text{if } -\theta_{db2} > \theta > -\theta_{db3} \\ \theta_{db3} - \theta_{db2} & \text{if } \theta > \theta_{db3} \\ -\theta_{db3} + \theta_{db2} & \text{if } \theta < -\theta_{db3} \end{cases}$$

Figure 6:
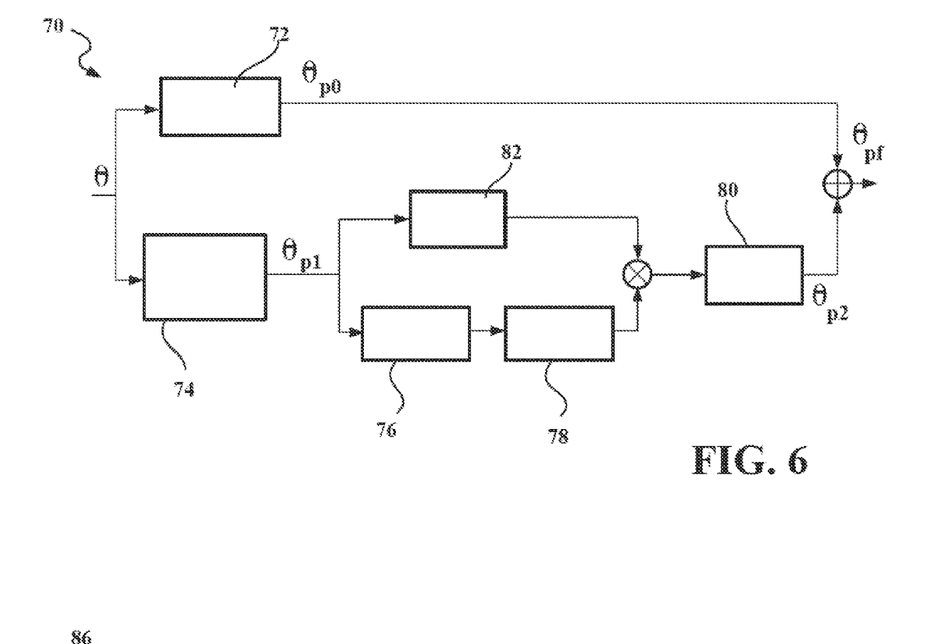
FIG. 6 is a schematic block diagram of a high frequency oscillation scheme usable with the controller shown in FIG. 1.

The signal $\theta_{p0}$ then corresponds to the input angle signal above $\theta_{db1}$ while $\theta_{p1}$ corresponds to the input signal between $\theta_{db2}$ and $\theta_{db3}$. In order to remove the high frequency oscillations from $\theta_{p1}$, this signal is further processed. Because the natural and desired cable 26 position is vertical, a filtering algorithm may be used, as shown at 70 in FIG. 6. The absolute signal of $\theta_{p1}$ is determined in an absolute logic block 76 and then the absolute signal passes through a rate limiter block 78. The rising limit is low and the falling limit is high, such that it takes time for the output signal to increase, filtering high frequency oscillations. However, the signal of the $\theta_{p1}$ can return to zero rapidly, avoiding a phase shift. This signal is then multiplied by the sign of $\theta_{p1}$, stored in a sign block 82. The resulting signal, can then optionally be slightly filtered with a usual low pass filter at a low pass block 80, resulting in the signal $\theta_{p2}$. Although, $\theta_{p0}$ and $\theta_{p2}$ can be used individually in the control, they can also be grouped as:

$$\theta_{pf} = \theta_{p0} + \theta_{p2}$$

Referring to FIGS. 5A-5C, a relation between the angles $\beta_i$ and $\theta_i$ needs to be obtained. A unit vector e, is aligned with the cable 26 and the cable's 26 endpoint coordinates are $[X_S, Y_S, Z_S]^T$. The cross product between e and unit vector [0 1 0] gives the normal to the plan $\sigma_1$ in which the cable 26 lies. The dot product of these results with the unit vector [1 0 0] leads to the angle $\theta_1$ cosine. The angle $\theta_2$ cosine is obtained similarly. Also, using the fact that $X^2+Y^2+Z^2=1$:

$$\text{dynamical } \cos\theta_1 = \frac{\sqrt{1-X_s^2-Y_s^2}}{\sqrt{1-Y_s^2}}, \cos\theta_2 = \frac{\sqrt{1-X_s^2-Y_s^2}}{\sqrt{1-X_s^2}}$$

The unit vector e coordinates are:

$X_S = \sin\theta_1 \cos\beta_1$ $Y_S = \sin\beta_1$ $Z_S = \cos\theta_1 \cos\beta_1$ The correspondence is:

$$\cos\beta_1 = \frac{\cos\theta_2}{\sqrt{1-\sin^2\theta_1 \sin^2\theta_2}}$$

-continued $$\sin\beta_1 = \frac{\cos\theta_1 \sin\theta_2}{\sqrt{1-\sin^2\theta_1 \sin^2\theta_2}}$$

Taking the derivatives of any questions of the previous equation leads to:

$$\dot{\beta}_1 = \frac{\dot{\theta}_2 \cos\theta_1 - \dot{\theta}_1 \sin\theta_1 \cos\theta_2 \sin\theta_2}{1-\sin^2\theta_1 \sin^2\theta_2}$$

In the following, the equations of motion are first obtained with a complete model called coupled motion. Then, with simplifications, a simplified model is obtained. With reference to FIGS. 1-4 and the parameters defined in FIGS. 5A-5C, the measured variable from the cable angle sensors 24 are $\theta_1$, corresponding the first axis 52, and $\theta_2$, corresponding to the second axis 54. The equations of motion for the payload 12 position are:

$$X_p = X_C + L_p \sin\theta_1 \cos\beta_1$$

$$Y_p = Y_C + L_p \sin\beta_1$$

$$Z_p = L_p \cos\theta_1 \cos\beta_1$$

where $X_p$, $Y_p$ and $Z_p$ are the payload 12 center of mass 42 position in fixed coordinates, $X_C$ and $Y_C$ are the cart 28 coordinates in fixed coordinates, and $L_p$ is the distance between the cable pivot point 60 and the payload 12 center of mass 42. The potential energy is provided as follows:

$$V = -mgL_p \cos\beta_1 \cos\theta_1$$

where m is the payload 12 mass and the kinetic energy is expressed as:

$$T = \frac{1}{2}M_x \dot{X}_c^2 + \frac{1}{2}M_y \dot{X}_c^2 + \frac{1}{2}m(\dot{X}_p^2 + \dot{Y}_p^2 + \dot{Z}_p^2)$$

where $M_X$ is the cart 28 mass in the X direction and $M_Y$ is the cart 28 mass in the Y direction. One should note that the cable 26 mass was neglected. The equations of motion are obtained from the previous two equations and the Lagrange method as follows:

$$F_X = M_x \ddot{X}_c + m(\ddot{X}_c + \ddot{L}_p \cos\beta_1 \sin\theta_1 - L_p \sin\beta_1 \sin\theta_1 \dot{\beta}_1 - L_p \cos\beta_1 \sin\theta_1 \dot{\beta}_1^2 - L_p \cos\beta_1 \sin\theta_1 \dot{\theta}_1^2 + 2\cos\beta_1 \cos\theta_1 \dot{L}_p \dot{\theta}_1 - 2L_p \sin\beta_1 \cos\theta_1 \dot{\beta}_1 \dot{\theta}_1 - 2\dot{L}_p \dot{\beta}_1 \sin\beta_1 \sin\theta_1 + \ddot{L}_p \cos\theta_1 \cos\beta_1 \dot{\theta}_1)$$

$$F_Y = M_y \ddot{Y}_c + m(\ddot{Y}_c + 2\dot{L}_p \dot{\beta}_1 \cos\beta_1 - L_p \dot{\beta}_1^2 \sin\beta_1 + L_p \cos\beta_1 \ddot{\beta}_1 + \ddot{L}_p \sin\beta_1)$$

$$F_L = m(\ddot{X}_c \cos\beta_1 \sin\theta_1 + \ddot{L}_p + \ddot{Y}_c \sin\beta_1 - L_p \dot{\beta}_1^2 - L_p \dot{\theta}_1^2 \cos^2\beta_1 - g\cos\beta_1 \cos\theta_1)$$

$$F_Z = 0 = M_z \ddot{Z}_c + m(\ddot{Z}_c + L\cos\theta_1 \dot{\theta}_1^2 + L\sin\theta_1 \ddot{\theta}_1 + L\cos\theta_2 \dot{\theta}_2^2 + L\sin\theta_2 \ddot{\theta}_2 + g)$$

$$F_{\theta_1} = 0 = m(L\ddot{\theta}_1 + \ddot{x}\cos\theta_1 + g\sin\theta_1 + 2\dot{L}_p \dot{\theta}_1 \cos\beta_1 - 2L_p \dot{\theta}_1 \dot{\beta}_1 \sin\beta_1)L\cos\beta_1$$

$$F_{\beta_1} = 0 = m(L_p \ddot{\beta}_1 + L_p \ddot{y}\cos\beta_1 - \ddot{x}\sin\beta \sin\theta + 2\dot{\beta}_1 \dot{L} + L_p \dot{\theta}_1^2 \cos\beta_1 \sin\beta_1 + mg\sin\beta_1 \cos\theta_1)L_p$$

One should note that similar equations could be found with the other angle representation as ($\theta_2$, $\beta_2$). Additionally, the coupling between angles $\theta_1$ and $\theta_2$ is negligible for relatively small angles and angular velocities. Thus, motion along the X axis 19 and Y axis 17 will be treated separately, as described below.

With only one degree-of-freedom and a small rotation rate, where $\theta$ refers to $\theta_1$ or $\theta_2$, while the other angle remains fixed, equations of motion are as follows:

$$F = (M+m)\ddot{x} + m\ddot{\theta}L\cos\theta - mL\dot{\theta}^2 \sin\theta + m\ddot{L}\sin\theta + 2m\dot{\theta}\dot{L}\cos\theta$$

$$\tau = 0 = (\ddot{x}\cos\theta + g\sin\theta + L\ddot{\theta} + 2\dot{L}\dot{\theta})mL$$

which can be simplified to the pendulum equations for constant cable 26 length L as follows:

$$F = (M+m)\ddot{x} + m\ddot{\theta}L\cos\theta - mL\dot{\theta}^2 \sin\theta$$

$$\tau = 0 = (\ddot{x}\cos\theta + g\sin\theta + L\ddot{\theta})mL$$

where M is the mass of the cart 28 and m is the mass of the payload 12. Assuming small angles and a slowly varying vertical translation and neglecting $\dot{\theta}^2$, the equations can be linearized as follows:

$$F = (M+m)\ddot{x} + m\ddot{\theta}L$$

$$0 = \ddot{x} + g\theta + L\ddot{\theta}$$

where L is considered constant over a time step and also corresponds to $L_p$.

The movement mechanism may be operated in a cooperation mode allowing the operator 33 to operate the movement device 22 by placing their hands 35 directly on the payload 12. The movement mechanism allows the operator 33 to impart an angle to the cable 26 by pushing the payload 12, and this angle is measured by the sensors 64 as a rotation ($\theta_1$ and $\theta_2$) of the first and second curved elements 36, 38 about the respective first and second axes 52, 54. The control system moves the cart 28 in response to the angle $\theta_1$ and $\theta_2$ of the cable 26 measured by the sensors 64 to keep the cable 26 vertical. Thus, the cart 28 moves in the direction desired by the operator 33, while controlling any sway of the cable 26, resulting in assistance to the operator 33 in moving the payload 12 in the X and Y directions. Additionally, since the controller 32 ensures that the cable 26 remains vertical, the operator 33 is not required to manually stop the load, since the control system manages itself to stop the payload 12. An autonomous mode, where the payload 12 position is prescribed, while reducing cable 26 sway, may also be desired.

The force F required for an operator 33 to move the payload 12 would be reduced because a measure of the imparted angle(s) $\theta_1$ and $\theta_2$ of the first and second curved elements 36, 38 about the respective first and second axes 52, 54 can be precisely and accurately measured. This results in a system that moves along the corresponding X axis 19 and/or Y axis 17.

Figure 7:
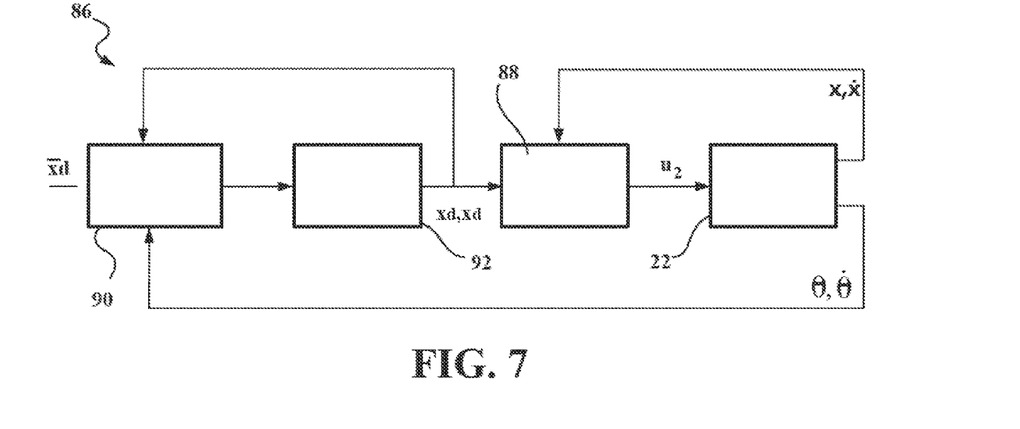
FIG. 7 is a schematic block diagram of a control scheme usable with the controller shown in FIG. 1.

The controller 32 includes a control block 86, shown in FIG. 7, which is configured to operate for cooperative motion or autonomous motion. Using only the last equation above, the cart 28 acceleration is considered as the input. The payload 12 and cart 28 mass do not need to be known. The following equations are therefore obtained in a Laplace domain as follows:

$$\ddot{X}(s) + g\theta(s) + s^2 L\theta(s) = 0$$

The state-space representation is as follows:

$$\dot{\bar{x}}_s = A_s \bar{x}_s + B_s u_s$$

$$y_s = C_s \bar{x}_s + D_s u_s$$

where $y_S$ the output vector, $\bar{x}_S$ is the state vector, $u_s$ is the input scalar, $A_S$ is an n×n state matrix, $B_S$ is an n×m input matrix, $C_S$ is a p×n output matrix, $D_S$ is a p×m feed through matrix and where n is the number of states, m is the number of inputs and p is the number of outputs. Here, $\bar{x}_S = [x\ \dot{x}\ \theta\ \dot{\theta}]^T$ and $u_S = \ddot{x}$, with $$A_s = \begin{bmatrix} 0 & 1 & 0 & 0 \\ 0 & 0 & 0 & 0 \\ 0 & 0 & 0 & 1 \\ 0 & 0 & \frac{-g}{L} & 0 \end{bmatrix} \text{ and } B_s = \begin{bmatrix} 0 \\ 1 \\ 0 \\ \frac{-1}{L} \end{bmatrix}$$

The above equation, obtained from the Laplace domain, is used, where $u = \ddot{x}$, the control law is $u_S = K_R e$, where:

$$K_R = \lfloor K_x\ K_v\ -K_\theta\ -K_{\theta p} \rfloor \text{ and } e = \begin{bmatrix} x_d - x \\ \dot{x}_d - \dot{x} \\ \theta_d - \theta \\ \dot{\theta}_d - \dot{\theta} \end{bmatrix},$$

where $\dot{x}_d$, $\theta_d$, and $\dot{\theta}_d$ equal zero.

Referring again to the control logic block of FIG. 7, the input, $u_S$, is the acceleration of the cart 28, and because controlling acceleration is not practical, velocity control is used in the cooperation mode and position control is used in the autonomous mode. The output of the latter lower level controller block 88 is shown as $u_2$ in FIG. 7.

In the cooperation mode, the state space controller block 90 output of FIG. 7 is obtained as a discrete velocity with a zero-order-hold integration, as follows:

$$\ddot{x}_{d(k)} = u = K_r e$$

$$\dot{x}_{d(k)} = \dot{x}_{d(k-1)} + \ddot{x}_{d(k)} T_S$$

Likewise, in the autonomous mode, the state space controller block 90 output of FIG. 7 is obtained as a position by integrating once more, as follows:

$$x_{d(k)} = x_{d(k-1)} + \dot{x}_{d(k-1)} T_S + 0.5 \ddot{x}_{d(k)} T_S^2$$

One should note that the measured velocity could be used in the preceding equations instead of the last time step desired value. This integration method is used to achieve acceleration control in an admittance control scheme. The desired acceleration is then obtained by using velocity or position control, which is more practical. It is also possible to additionally use computed torque control using the previous force equations. Although the payload 12 and cart 28 mass would then be required, an approximation is sufficient since feedback control is also used. Additionally, the payload 12 and cart 28 mass are not required in order to adapt the state space controller block 90 gains to varying parameters. Additionally, a limit and saturation block 92 may be used for virtual walls and to limit velocity and acceleration of the cart 28.

In the cooperation mode, since there is no reference position, $K_x$ is set to zero. The control gain $K_{\theta p}$, i.e., gain on the angular velocity signal, can be optionally used, depending on the angle derivative signal quality. An adaptive controller 32, based on pole placement and state space control may be used. The pole of the system may be obtained by:

$$\det[s1 - A + BK_r]$$

leading to the equation:

$$\frac{s^3 L + s^2(K_\theta p + K_v L) + s(g + K_\theta) + K_v g}{L}$$

where $K_\theta$ and $K_{\theta p}$ are assumed negative.

The transfer function from angle $\theta$ to an angle initial condition $\theta_0$ is as follows:

$$\frac{\theta_0 (s + K_v) L s}{s^3 L + s^2 (K_\theta p + K_v L) + s(g + K_\theta) + K_v g}$$

The poles may be placed to the following:

$$(s+p_1)(s^2 + 2\zeta_1 \omega_{n1} + \omega_{n1}^2)$$

In a first method, $K_v$ and $K_\theta$ are used, which leads to the following:

$$K_v = p_1 + 2\zeta_1 \omega_{n1}$$

$$\frac{g}{L} + \frac{K_\theta}{L} = \omega_{n1}^2 + 2\zeta_1 \omega_{n1} p_1$$

$$\frac{K_v g}{L} = p_1 \omega_{n1}^2$$

and then, the following are used:

$$p_1 = \frac{2g \zeta_1 \omega_{n1}}{-g + \omega_{n1}^2 L}$$

$$K_v = \frac{p_1 \omega_{n1}^2 L}{g}$$

$$K_\theta = \left( \omega_{n1}^2 - \frac{g}{L} + 2\zeta_1 \omega_{n1} p_1 \right) L$$

$$\text{where } \omega_{n1} \geq \sqrt{\frac{g}{L}}$$

and $\zeta$ are design parameters. The control gains are thus obtained. The transfer function zero influences the response, but without practical effect, since it is relatively high, $\omega_{n1}$ is chosen very close to $$\sqrt{\frac{g}{L}},$$

but not too close to avoid numerical problems.

The control scheme is then used with these gains to manage the cooperation with the operator 33, while stabilizing the cable 26.

In a second method, $K_v$, $K_\theta$, and $K_{\theta p}$ are used, which leads to the following:

$$K_v + \frac{K_{\theta p}}{L} = p_1 + 2\zeta_1 \omega_{n1}$$

$$\frac{g}{L} + \frac{K_\theta}{L} = \omega_{n1}^2 + 2\zeta_1 \omega_{n1} p_1$$

-continued $$\frac{K_v g}{L} = p_1 \omega_{n1}^2$$

The second method allows the poles to remain constant. Using the gain $K_{\theta p}$ allows the cart 28 to move in regards to the angles $\theta_1$ and $\theta_2$ and angular velocity. The following is then obtained:

$$p_1 = \frac{-g(K_{\theta p} - 2\zeta \omega_{n1} L)}{L(-g + \omega_{n1}^2 L)}$$

$$K_v = \frac{p_1 \omega_{n1}^2 L}{g}$$

$$K_\theta = \left(\omega_{n1}^2 - \frac{g}{L} + 2\zeta \omega_{n1} p_1\right) L$$

where $$\omega_{n1} \geq \sqrt{\frac{g}{L}},$$

$\zeta$, and $K_{\theta p}$ are design parameters. The control gains are thus obtained. The transfer function zero influences the response, but without practical effect since it is relatively high, $\omega_{n1}$ is chosen very close to $$\sqrt{\frac{g}{L}},$$

but not too close to avoid numerical problems.

The control scheme is then used with these gains to manage the cooperation with the operator 33, while stabilizing the movement device 22.

Neglected terms from the complete model as $\dot{L}$, $\dot{\beta}$, $\dot{\theta}^2$ and viscous friction can be compensated for, for example, with gains $K_\theta$ and $K_{\theta p}$ by considering the terms constant over a time step, similarly as with the lengths L of the cable 26.

Control gains may also be heuristically modified from the computed gains. Additionally, control gains on $\theta_{p0}$ and $\theta_{p2}$ and their derivatives may be different from each other.

In the autonomous mode, $K_x$ is used to control the cart 28 position. The control gain $K_{\theta p}$ can be optionally used. An adaptive controller 32 based on pole placement and state space control using $K_{\theta p}$ is provided. Similar to the cooperation mode, the system poles are:

$$\frac{s^4 L + s^3(K_\theta p + K_v L) + s^2(g + K_\theta + K_x L) + s(K_v g) + K_x g}{L}$$

where $K_\theta$ and $K_{\theta p}$ are assumed to be negative.

There is a compromise between the cart 28 position trajectory and the cable 26 oscillation cancellation. In regards to the equations, this is due to the transfer function zeros.

Pole placement is used using the characteristic equation:

$$(s+p_1)^2(s^2 + 2\zeta_1 \omega_{n1} + \omega_{n1}^2)$$

Equaling the previous equations for the system poles and pole placement provides:

$$2\zeta_1 \omega_{n1} + 2p_1 = K_v + \frac{K_{\theta p}}{L}$$

$$\omega_{n1}^2 + 4\zeta_1 \omega_{n1} p_1 + p_1^2 = \frac{K_\theta}{L} + K_x + \frac{g}{L}$$

$$2\omega_{n1}^2 p_1 + 2\zeta_1 \omega_{n1} p_1^2 = \frac{K_v g}{L}$$

$$\omega_{n1}^2 p_1^2 = \frac{K_x g}{L}$$

and then the following are used:
where $$\omega_{n1} \geq \sqrt{\frac{g}{L}}$$

and $\zeta$ are design parameters and $p_1$ is heuristically chosen to be equal to $\omega_{n1}$ as to lie on the same circle as the other poles. It is a design choice to use two complex poles and two equal real poles as other choices are possible. The state space controller gains to adapt are thus obtained. The transfer function zero influence the response but without practical effect since it is relatively high. A value of $\omega_{n1}$ is chosen very close to $$\sqrt{\frac{g}{L}},$$

but not too close to avoid numerical problems.

$$K_x = \frac{\omega_{n1}^2 p_1^2 L}{g}$$

$$K_v = \frac{2\omega_{n1} p_1 L(\omega_{n1} + \zeta_1 p_1)}{g}$$

$$K_\theta = \left(\omega_{n1}^2 + 4\zeta_1 \omega_{n1} p_1 + p_1^2 - K_x - \frac{g}{L}\right) L$$

$$K_{\theta p} = (2\zeta_1 \omega_{n1} + 2p_1 - K_v) L$$

One should note that the operator 33 can still push the payload 12 in autonomous mode. The cart 28 position will move in the direction desired by the operator 33, while be attracted to its reference position and cancelling oscillations of the movement device 22. Depending on the control gains, it will be more or less easy to move the cart 28 away from its reference position. Referring to FIG. 7, the control block 86 will then be used with these gains to manage autonomous and cooperation with the operator 33, while stabilizing the movement device 22.

Neglected terms from the complete model as $\dot{L}$, $\dot{\beta}$, $\dot{\theta}^2$ and viscous friction can be compensated for, for example, with gains $K_\theta$ and $K_{\theta p}$ by considering the terms constant over a time step, similarly as with the cable 26 length L.

Control gains can also be heuristically modified from the computed gains. Additionally, control gains on $\theta_{p0}$ and $\theta_{p2}$ and their derivatives can be different from one another.

When switching between the modes, i.e., cooperation mode, autonomous mode, stopping, and the like, rude acceleration and jerk profile may be required. The most frequent abrupt profile happens when switching modes when the cable 26 angles $\theta_1$ and $\theta_2$ are non-zero. "Bumpless" transfer or smooth transfer between modes may be achieved. In one embodiment, the last control input is memorized or observed. In another embodiment, the measured velocity is memorized when the mode switch happens. In the cooperation mode, the output bumpless velocity is as follows:

$$v_{DesBumpl} = a_{bt} v_{mem} + (1-a_{bt}) v_{des}$$

The variable $a_{bt}$ is reinitialized at 1 when a mode switch happens and is then multiplied by $b_{bt}$ at each time step. At first $v_{DesBumpl}$ is then equal to the measured velocity ($v_{mem}$) and after some time, depending on parameter $b_{bt}$, $a_{bt}$ goes to 0 and $v_{DesBumpl}$ to $v_{des}$. The goal is to go from the present velocity as the mode switch moment ($v_{mem}$) to the desired velocity ($v_{des}$) in a smooth filtered way. For the autonomous mode, the desired position is first reset to the measured position and the desired bumpless velocity is integrated to obtain a new desired position respecting this velocity. Further smoothing may also be possible by considering the acceleration in the mode switch.

In addition to the movement in the X direction and Y direction, the payload 12 may also be moved in a vertical direction, i.e., in the Z direction. In order to control the vertical movement of the cable 26, a winch 94, in combination with a load cell 96 (or force sensor), and an accelerometer 97 may be used. The winch 94 may use a DC motor with a pulley to roll the cable 26 and thus change the length L of the cable 26. The accelerometer 97 may be placed in line with the cable 26, near the attachment point 84 of the payload 12.

In order for the operator 33 to be able to apply forces anywhere on the payload 12, vertical cooperation must be obtained. More specifically, vertical cooperation is movement of the payload 12 in the vertical direction. To achieve vertical cooperation, the load cell 96 is placed in line with the cable 26, before the payload 12. A signal of the load cell 96 depends on the inertial effects of the load. This signal is:

$$f_{1cell} = f_H + m(\ddot{X}_c \cos\beta_1 \sin\theta_1 + \ddot{L}_p - L_p \dot{\beta}_1^2 - L_p \dot{\theta}_1^2 \cos^2\beta_1 + \ddot{Y}_c \sin\beta_1 - g\cos\beta_1 \cos - g\cos\beta_1 \cos\theta_1)$$

$$= f_H + ma_p$$

where $f_H$ is the operator 33 force and $a_p$ is the payload 12 acceleration:

$$a_p = (\ddot{X}_c \cos\beta_1 \sin\theta_1 + \ddot{L}_p - L_p \dot{\beta}_1^2 - L_p \dot{\theta}_1^2 \cos^2\beta_1 + \ddot{Y}_c \sin\beta_1 - g\cos\beta_1 \cos\theta_1)$$

In order to estimate the payload 12 mass or the operator 33 force, the dynamical effects must be compensated for in the control. Some methods compensating for the dynamical effects may include the individual compensation method, the fusion method, the accelerator method, and the like.

The individual method is used to compute each term of the previous equation individually. The estimation is then:

$$\hat{a}_{pi} = (\ddot{X}_c \cos\beta_1 \sin\theta_1 + \ddot{L}_p - L_p \dot{\beta}_1^2 - L_p \dot{\theta}_1^2 \cos^2\beta_1 + \ddot{Y}_c \sin\beta_1 - g\ co\ \beta_1 \cos\theta_1)$$

where $\hat{a}_{pi}$ is the payload acceleration estimation with the individual method.

From the previous equation, several measures are needed. The cable angle $\theta_1$ and $\theta_2$ (from which $\beta_1$ and $\beta_2$ are deduced), are obtained with the cable angle sensor, as explained previously. The cable angular velocity $\dot{\theta}_1$ and $\dot{\theta}_2$, (from which $\dot{\beta}_1$ and $\dot{\beta}_2$ are deduced), are obtained from the cable angle derivatives (done here with the Kalman filter). However, rate gyroscopes could also be placed on the cable angle sensor shafts. The cable length $L_c$ is obtained with a position sensor on the winch 94 motor shaft (done here with a potentiometer and an incremental encoder, which are fused together). The cable length $L_c$ is the length between the cable pivot point 60 and the payload attachment point 84. The payload 12 position, $L_p$, is obtained with:

$$L_p = L_c + \delta_{cm}$$

where $\delta_{cm}$ is an approximation of the payload 12 center of mass from the payload 12 attachment point 84. The cable vertical acceleration, $\ddot{L}_p$, is obtained from a fusion from the desired acceleration and the cable length L measure second derivative. One of these two signals could also be used directly. A rotational accelerometer or a gyroscope could also be placed on the winch 94 motor shaft. The gyroscope signal should be derived to obtain the angular acceleration. From this, the measure of the cable vertical acceleration can be obtained. The cart acceleration, $\ddot{X}_C$ and $\ddot{Y}_C$, is obtained from a fusion from the desired acceleration and the cable length L measure second derivative. One of these two signals could also be used directly. The cart acceleration may also be obtained by placing a rotational accelerometer or a gyroscope (derivative) on the motor shafts. Linear accelerometers could also be placed on the cart 28. The acceleration $\hat{a}_{pi}$ is then obtained by inputting all of these measures and estimations into the previous equation.

The cable vertical acceleration $\ddot{L}_p$ and the cart acceleration $\ddot{X}_C$ and $\ddot{Y}_C$ are obtained by fusing the desired acceleration with the position measure second derivative. Using the desired acceleration alone may be inexact, while the position measure second derivative is known to be very noisy. However, fusing the signals can take advantage of both by using Kalman filtering.

A third order acceleration model is used:

$$A = \begin{bmatrix} 1 & T_s & 0.5T_s^2 \\ 0 & 1 & T_s \\ 0 & 0 & 1 \end{bmatrix}$$

$$B = [0\ 0\ 0]^T$$

$$C = [1\ 0\ 0]^T$$

to find the state estimate $\hat{x}_i(k)$:

$$\hat{x}_i(k) = [\hat{e}_i(k) \dot{\hat{e}}_i(k) \ddot{\hat{e}}_i(k)]^T$$

The acceleration estimation is then reconstructed with:

$$\hat{q}_i = q_{di} + \hat{e}_i$$

$$\dot{\hat{q}}_i = \dot{q}_{di} + \dot{\hat{e}}_i$$

$$\ddot{\hat{q}}_i = \ddot{q}_{di} + \ddot{\hat{e}}_i$$

where $\hat{q}_i$, $\dot{\hat{q}}_i$, and $\ddot{\hat{q}}_i$ are respectively the position, velocity, and acceleration final estimation.

This leads to a more precise estimation than if the Kalman filter was applied directly to the signal $q_i$. More specifically, the error signal has less amplitude and bandwidth than the joint signal so that it is easier to obtain a signal of quality, while reducing filtering drawbacks. By way of a non-limiting example, if the filter parameters are set to high filtering values, the estimation will be closed to the desired movement instead of being close to zero with a filter directly on the joint signal.

For the cart acceleration, the idea is similar, but is more complex. More specifically, in X and Y cooperation mode, the desired velocity and acceleration are known, but not the desired position. It is not desirable to integrate the desired velocity to obtain the desired position since it would drift with time. The error is then defined as:

$$e_i = \dot{q}_{di} - \dot{q}_i$$

and filtered with a Kalman second order model velocity model. The variable $q_i$ can be inputted directly or after being slightly filtered as with a third order Kalman filter acceleration model. Joint acceleration is then reconstructed as with the cable vertical acceleration.

The individual method has the advantage of having no drift, contrarily to the accelerometer method, and the dynamical effect estimation can be accurate, since it can be done at the payload center of mass position.

One should note that the individual and fusion method could be used not only for a suspended cable but also for other mechanisms, such as an articulated mechanism, and the like.

Figure 10:
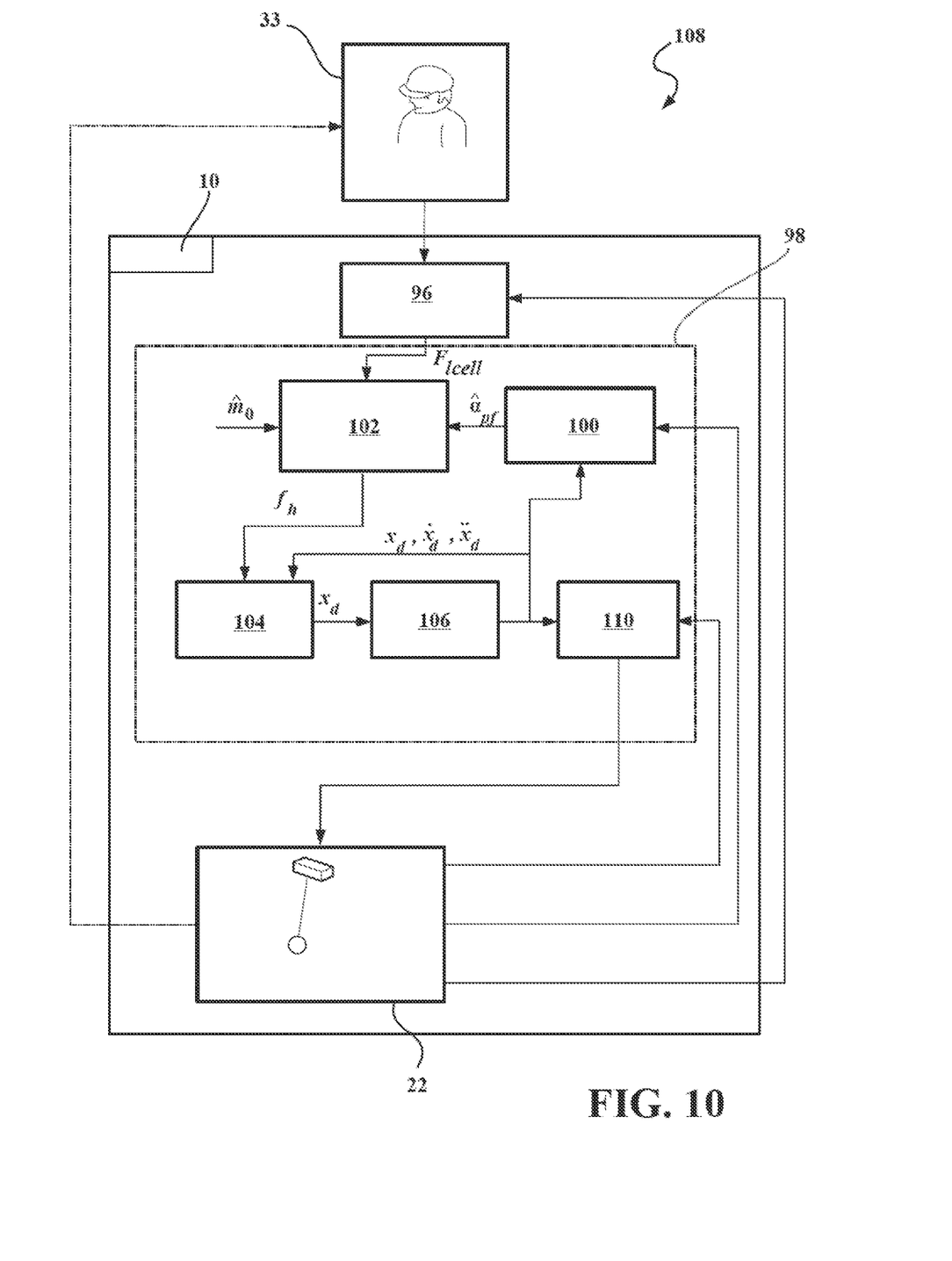
FIG. 10 is another schematic block diagram of a control scheme of the float mode.

In the fusion method, the accelerometer and the individual method are fused to seize the advantages of each method, as shown at 100 in FIG. 10. The acceleration at the accelerometer position, $L_a$, is first obtained independently by the accelerometer and by the individual method. The corresponding individual terms and the accelerometer are fused at this position depending on the confidence of each term. With the corrected individual terms obtained in output, the acceleration is computed at the payload center of mass. The fusion at the accelerometer position is done here with linear data reconciliation with the equality:

$$E_1 + E_2 + E_3 + E_4 = E_5$$

where $$E_1 = \ddot{L}_a$$

$$E_2 = -L_a \dot{\beta}_1^2 - L_a \dot{\theta}_1^2 \cos^2\beta_1$$

$$E_3 = -g \cos\beta_1 \cos\theta_1$$

$$E_4 = \ddot{X}_c \cos\eta_1 \sin\theta_1 + \ddot{Y}_c \sin\beta_1$$

$$E_5 = a_{acc}$$

where $a_{acc}$ is an accelerometer signal and $E_1$ to $E_4$ are obtained with the individual method ($L_a$ is known from the cable length L and the distance from the accelerometer and the cable end point).

Using the Lagrangian method, the criteria is:

$$J = \frac{(\hat{E}_1 - E_{1m})^2}{\sigma_{E1}^2} + \frac{(\hat{E}_2 - E_{2m})^2}{\sigma_{E2}^2} + \frac{(\hat{E}_3 - E_{3m})^2}{\sigma_{E3}^2} + \frac{(\hat{E}_4 - E_{4m})^2}{\sigma_{E4}^2} + \frac{(\hat{E}_5 - E_{5m})^2}{\sigma_{E5}^2} + \lambda^T(\hat{E}_1 + \hat{E}_2 + \hat{E}_3 + \hat{E}_4 - \hat{E}_5)$$

where $\hat{E}_1$ is a given effect final estimation, $E_{im}$ is the given effect input measure or initial estimation and $\sigma_{Ei}$ are confidence terms. The solution is given by:

$$E_{out} = E_{in} - W^{-1}H^T(HW^{-1}H^T)^{-1}HE_{in}$$

where $$E_{in} = [E_{1m} E_{2m} E_{3m} E_{4m} E_{5m}]^T$$

$$E_{out} = [\hat{E}_1 \hat{E}_2 \hat{E}_3 \hat{E}_4 \hat{E}_5]^T$$

$$H = [1\,1\,1\,1\,-1]$$

$$W = \text{diag}\left(\frac{1}{\sigma_{E1}}, \frac{1}{\sigma_{E2}}, \frac{1}{\sigma_{E3}}, \frac{1}{\sigma_{E4}}, \frac{1}{\sigma_{E5}}\right)$$

Then, with $\hat{E}_1$ to $\hat{E}_4$, the payload acceleration estimation is computed:

$$\hat{a}_{pf} = \hat{E}_1 + \hat{E}_{21}\frac{L_p}{L_a} + \hat{E}_3 + \hat{E}_4$$

where $\hat{a}_{pf}$ is the payload acceleration estimation with the fusion method at 100 in FIG. 10.

Figure 8:
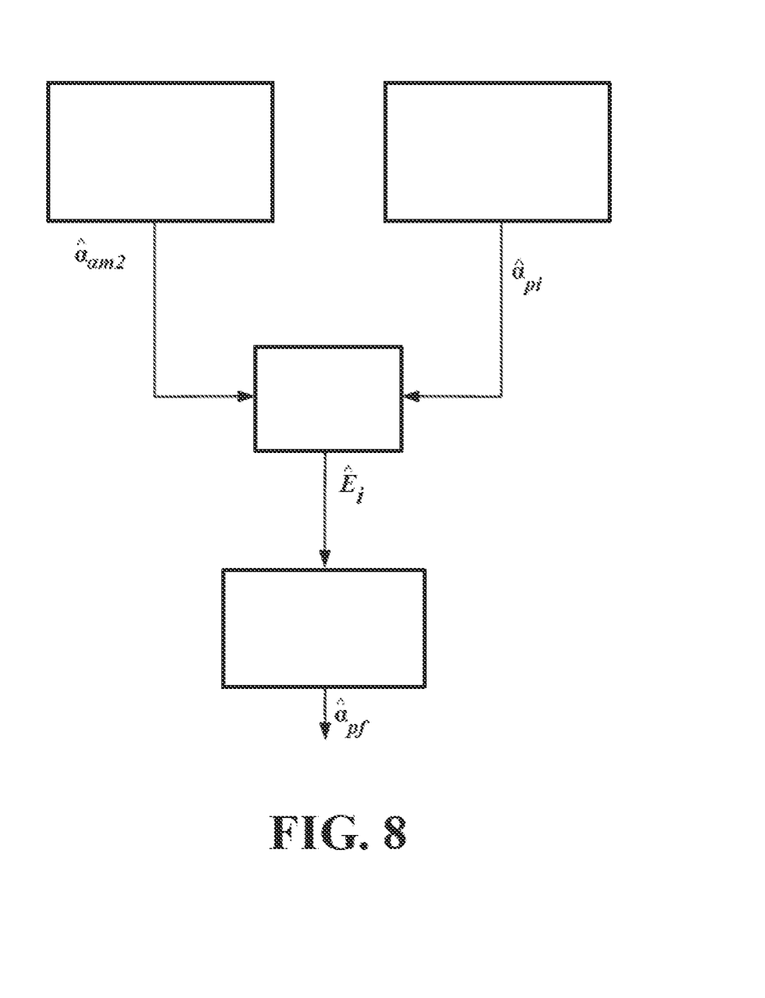
FIG. 8 is a schematic block diagram of an acceleration estimation with a fusion method.

Referring now to FIG. 8, a general scheme of the fusion method is shown.

It would also be possible to add other accelerometers (or fuse only accelerometers) or other sensors and fuse them with the same technique by slightly modifying the above vectors or to use fusion with Kalman filtering, and the like. It should be appreciated that the individual method and the fusion method may also be used with other mechanisms, such as an articulated mechanism, and the like.

The mass of the payload 12 may also be monitored for reasons which include, but are not limited to knowing if the device is loaded or if the mass exceeds the payload limit, and the like. This information could also be used in the position or velocity control to enhance the performances. It may also be used to estimate the payload mass prior to entering a float mode 102. More specifically, the mass will be needed to estimate the applied human force, as will be explained in more detail below. If, for example, the estimate is $\hat{m} = F_{lcell}/g$ (or a filtered version of this), the mass would have to be still with a right cable for the estimation to be accurate, which is not useful in practice. The mass is then found with a filtered version $\hat{m} = F_{lcell}/\hat{a}_{pf}$ (or an identification technique) where $\hat{a}_{pf}$ is the fusion method estimation, as provided above.

Figure 9:
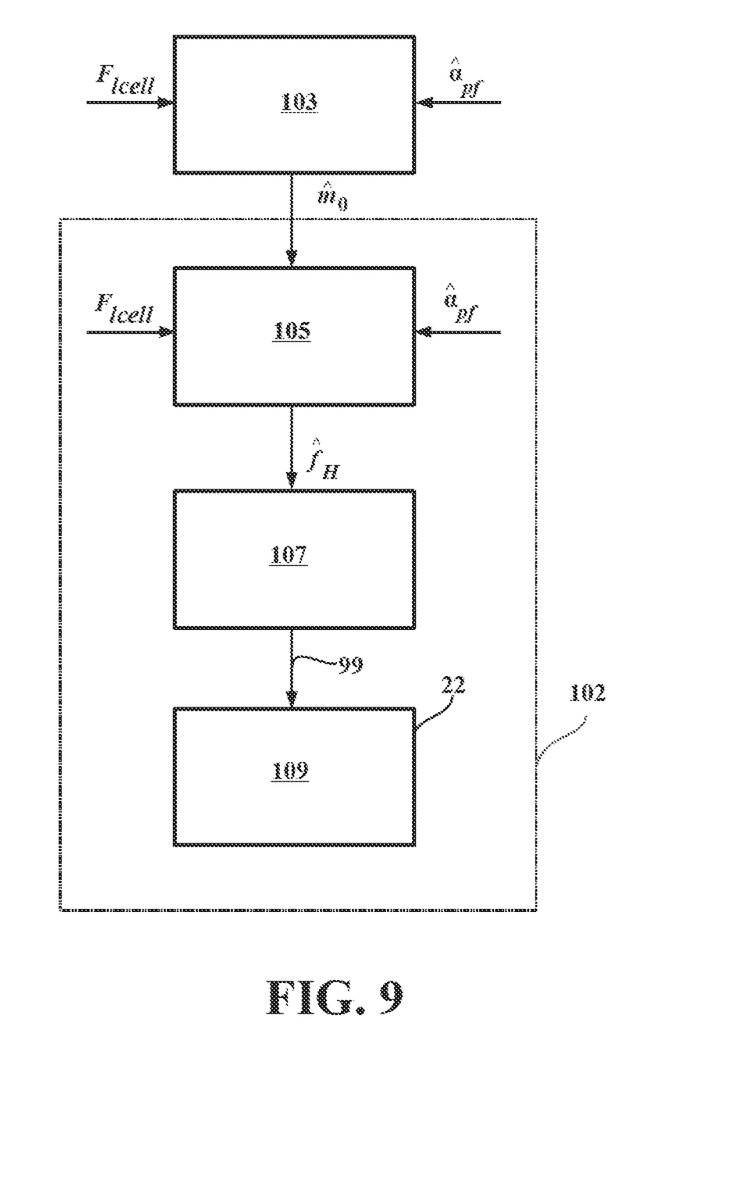
FIG. 9 is a schematic block diagram of a float mode control scheme.

The human force estimation is used in a float mode at 102 in FIGS. 9 and 10. Prior to entering this float mode 102, the payload mass is determined at 103, as was explained in the previous section. The human force is deduced at 105 from the following equation:

$$\hat{f}_H = F_{lcell} - \hat{m}_0 \hat{a}_{pf}$$

where $\hat{a}_{pf}$ is the payload acceleration estimation, as described above and the fusion method, $F_{lcell}$ is the load cell 96 signal and $\hat{m}_0$ is the payload mass estimation prior to entering float mode. The estimated human force signal can be treated in different ways. First of all, a deadband can be applied to cope with estimation errors:

$$f_{out} = \begin{cases} 0 & \text{if } -F_{dband} < F_{in} < F_{dband} \\ f_{in} - f_{dband} & \text{if } F_{in} > F_{dband} \\ f_{in} + f_{dband} & \text{if } F_{in} < -F_{dband} \end{cases}$$

Where $F_{dband}$ is a deadband to be defined.

The signal can also be low pass filtered, before and after the deadband. The effect is different and is a design parameter.

The compensation of the dynamical effects and the deadband can also be a function of each individual dynamical effect. This can be used to reduce noise in the compensation and/or add a deadband for a given dynamical effect only if this effect is present. This is useful if the deadband must be high, due to high uncertainties.

The absolute signal is slightly filtered to remove high frequency noise. A rate limiter is then applied, which allows the signal to raise rapidly, but to decrease much more slowly to keep the effect a given time. By way of a non-limiting example, if the signal only passes temporarily to zero, the signal is then converted from zero to one here heuristically with an exponential function, such as:

$$1-e^{a_e w_e}$$

where $w_e$ is the processed signal, and $a_e$ is a design parameter. The given dynamical effect deadband and/or compensation is then multiplied by this value. For example, if the total uncertainty is 20 newtons (N) because four effects each have an uncertainty of 5N, and only one effect is present, as the cable vertical acceleration, the deadband could be set to only 5N instead of 20N. The deadband is raised only if other effects are present. This must be well tuned so it remains intuitive to the operator.

Prior to entering the float mode 102, the payload mass is estimated, as described above, and is frozen to this value called $\hat{m}_0$. While in the float mode 102, the human force is estimated and processed, as also described above. This estimation is sent to an admittance controller 98 at 107 which computes a command 99 to be sent to the mechanism 22 at 109. The general float mode process is shown in FIG. 9.

Referring now to FIG. 10, a more detailed control scheme is shown. A PID controller is used as the position controller. The payload 12 mass estimation could also be used to enhance the control performances.

The admittance controller 98 accepts a force as an input, which is measured, and reacts with a displacement, i.e., position or velocity, in the vertical direction at output at 104. This displacement output, i.e., position, velocity, and acceleration, are processed to saturation and limits at 106 and the output displacements, i.e., position, velocity, and acceleration, are sent to the position controller at 110. The trajectory to be followed by the mechanism 22 can be prescribed as a desired trajectory. Position control is used since dynamical effects, such as gravity, are permanently acting on the load.

Referring again to FIG. 10, a control scheme is shown at 108. A PID controller is used as the position controller at 110. The payload 12 mass estimation could also be used to enhance the control performances.

While the best modes for carrying out the disclosure have been described in detail, those familiar with the art to which this disclosure relates will recognize various alternative designs and embodiments for practicing the disclosure within the scope of the appended claims.

The invention claimed is:

1. A movement device configured determine a direction of intended movement of a payload, the movement device comprising:
   an attachment portion;
   a plurality of housings operatively extending from the attachment portion;
   a first curved element and a second curved element extending between respective ends;
   wherein the ends of the first and second curved elements are pivotally attached to a respective one of the plurality of housings;
   wherein each of the first and second curved elements forms a partial circle;
   wherein the first curved element defines a first slot and the second curved element defines a second slot;
   wherein the first curved element perpendicularly overlaps with the second curved element such that the first slot of the first curved element is in perpendicular relationship to the second slot of the second curved element;
   wherein the first curved element is configured to pivot about a first axis and the second curved element is configured to pivot about a second axis, which extends in perpendicular relationship to the first axis;
   a cable extending from the attachment portion and through each of the first slot and the second slot;
   wherein the cable is configured to pivot relative to the attachment portion such that the cable angularly displaces at least one of the first and second curved elements about the respective first and second axis; and
   a cable angle sensor configured to measure the angular displacement of the at least one of the first and second curved elements.

2. A movement system, as set forth in claim 1, the movement device further including a winch configured to move the cable in a Z direction to vary a length of the cable and move the payload in the Z direction.

3. A movement system, as set forth in claim 2, the movement device further including a load cell operatively connected to the cable and configured to sense a load applied to the payload.

4. A movement device, as set forth in claim 1, wherein the movement device further includes a cart operatively connected to at least one of the trolley and the bridge crane;
   wherein the cart is configured to move along at least one of the respective X axis and Y axis corresponding to angular displacement of the at least one of the first and second curved elements.

5. A movement device, as set forth in claim 4, further comprising a controller operatively connected between the sensor and the cart;
   wherein the controller is configured to receive a signal from the sensor indicating the measure of the angular displacement of the at least one of the first and second elements and, in turn, send a signal to the cart to move the cart along the at least one of the X axis and the Y axis in response to the signal received from the sensor.

6. A movement device, as set forth in claim 5, wherein the movement device further includes:
   a plurality of bearings, wherein one of the plurality of bearings is disposed in a respective one of each of the housings; and
   a plurality of shafts, wherein one of the plurality of shafts pivotally interconnects one of the ends of a respective one of the first and second curved elements with the respective housing such that the shafts are pivotally supported by the respective bearing.

7. A movement device, as set forth in claim 6, wherein the cable angle sensor includes:
   a pair of encoders operatively connected to a respective one of the first curved element and the second curved element; and
   a pair of sensors operatively connected to a respective one of the first curved element and the second curved element;
   wherein the sensor and the encoder corresponding to the respective first curved element and the second curved element are configured to provide a signal to the controller corresponding to the angular displacement of the respective first curved element and second curved element.

8. A movement device, as set forth in claim 7, wherein the sensors are Hall effect sensors.

9. A movement system configured for moving a payload, the movement system comprising:

a bridge crane configured for movement along an X axis;
a trolley movably attached to the bridge crane and configured for movement along a Y axis, in perpendicular relationship to the X axis;
a movement device depending from the trolley, wherein the movement device includes:
an attachment portion;
a plurality of housings operatively extending from the attachment portion;
a first curved element and a second curved element extending between respective ends;
wherein the ends of the first and second curved elements are pivotally attached to a respective one of the plurality of housings;
wherein each of the first and second curved elements forms a partial circle;
wherein the first curved element defines a first slot and the second curved element defines a second slot;
wherein the first curved element perpendicularly overlaps with the second curved element such that the first slot of the first curved element is in perpendicular relationship to the second slot of the second curved element;
wherein the first curved element is configured to pivot about a first axis and the second curved element is configured to pivot about a second axis, which extends in perpendicular relationship to the first axis;
a cable extending from the attachment portion and through each of the first slot and the second slot;
wherein the cable is configured to pivot relative to the attachment portion such that the cable angularly displaces at least one of the first and second curved elements about the respective first and second axis; and
a cable angle sensor configured to measure the angular displacement of the at least one of the first and second curved elements.

10. A movement system, as set forth in claim 9, the movement device further including a winch configured to move the cable in a Z direction to vary a length of the cable and move the payload in the Z direction.

11. A movement system, as set forth in claim 10, the movement device further including a load cell operatively connected to the cable and configured to sense a load applied to the payload.

12. A movement system, as set forth in claim 9, wherein the movement device further includes a cart operatively connected to at least one of the trolley and the bridge crane;
wherein the cart is configured to move along at least one of the respective X axis and Y axis corresponding to angular displacement of the at least one of the first and second curved elements.

13. A movement system, as set forth in claim 12, further comprising a controller operatively connected between the sensor and the cart;
wherein the controller is configured to receive a signal from the sensor indicating the measure of the angular displacement of the at least one of the first and second elements and, in turn, send a signal to the cart to move the cart along the at least one of the X axis and the Y axis in response to the signal received from the sensor.

14. A movement system, as set forth in claim 13, wherein the movement device further includes:
a plurality of bearings, wherein one of the plurality of bearings is disposed in a respective one of each of the housings; and
a plurality of shafts, wherein one of the plurality of shafts pivotally interconnects one of the ends of a respective one of the first and second curved elements with the respective housing such that the shafts are pivotally supported by the respective bearing.

15. A movement system, as set forth in claim 14, wherein the cable angle sensor includes:
a pair of encoders operatively connected to a respective one of the first curved element and the second curved element; and
a pair of sensors operatively connected to a respective one of the first curved element and the second curved element;
wherein the sensor and the encoder corresponding to the respective first curved element and the second curved element are configured to provide a signal to the controller corresponding to the angular displacement of the respective first curved element and second curved element.

16. A movement system, as set forth in claim 15, wherein the sensors are Hall effect sensors.

* * * * *